US007162574B2

(12) United States Patent
Dawson et al.

(10) Patent No.: US 7,162,574 B2
(45) Date of Patent: Jan. 9, 2007

(54) TRANSACTION-BASED DATA STORAGE FOR MAGNETIC TAPE

(75) Inventors: Colin S. Dawson, Tucson, AZ (US); Howard N. Martin, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 10/420,151

(22) Filed: Apr. 22, 2003

(65) Prior Publication Data

US 2004/0215872 A1 Oct. 28, 2004

(51) Int. Cl.
*G06F 12/00* (2006.01)

(52) U.S. Cl. .................. 711/111; 711/118; 711/135; 711/171

(58) Field of Classification Search .................. None
See application file for complete search history.

(56) References Cited

U.S. PATENT DOCUMENTS

| 5,895,488 | A | 4/1999 | Loechel ............... 711/135 |
| 6,341,342 | B1 | 1/2002 | Thompson et al. ......... 711/166 |
| 6,459,540 | B1 | 10/2002 | Beavers et al. ............... 360/73 |
| 6,618,795 | B1 * | 9/2003 | Chan et al. ................. 711/162 |
| 2002/0065984 | A1 | 5/2002 | Thompson et al. ......... 711/166 |
| 2002/0083120 | A1 | 6/2002 | Soltis ........................ 709/217 |

\* cited by examiner

*Primary Examiner*—Reginald Bragdon
*Assistant Examiner*—Shawn Gu
(74) *Attorney, Agent, or Firm*—Scully, Scott, Murphy & Presser, P.C.

(57) ABSTRACT

Transaction-based data storage is provided by a host server (130) for a tape storage device (160). Data associated with a transaction is received from a client (105, 110, 115) at the host server (130) and provided to a cache (164) of the tape storage device (160), for writing to the tape medium (168). To confirm that data has been actually written to the tape medium (168) and is not still in the cache (164), a tape medium position corresponding to an amount of tape medium needed to store the data from a transaction is calculated by the host server (130) when it receives the data based on the amount of data and the data capacity of storage blocks of the tape (168). The host server (130) periodically queries the tape storage device (160) to learn the current tape position, and concludes the transaction when the tape storage device has written past the calculated position.

17 Claims, 3 Drawing Sheets

TRANSACTION-BASED DATA STORAGE FOR MAGNETIC TAPE

BACKGROUND OF THE INVENTION

1. Field of Invention

The invention relates generally to the field of data storage and, more specifically, to a method and apparatus for improving data transfer performance when storing data on magnetic tape using transaction-based data storage.

2. Description of Related Art

In today's computing world, a common architecture used in a network is a client/server configuration, where the server is responsible for performing actions on behalf of it clients. For example, the server may use this architecture to provide data storage services to its clients for the purpose of backup, archive, or space management of data. The clients send files to the server within the constructs of a transaction of guaranteed safekeeping. A transaction may include a storage phase, a commit phase, and a completion phase. All three steps must be completed successfully for the store operation to be successful.

Moreover, storage devices such as tape drives sometimes store data that it has been asked to write to a tape medium in temporary memory such as a cache. However, the fact that data resides in the cache and may not yet be on the actual storage media is not acceptable because a transaction is not considered to be complete until the corresponding end-user client data stored in a transaction is written to the actual storage location on the tape medium and removed from the intermediate cache. It is vital that all data be placed on the tape medium before a transaction can be committed and completed. This is to prevent loss of client data in the event that an error causes the tape drive to lose any data it may be holding in cache. Accordingly, after receiving all data for a transaction, the server will issue a command to the tape drive to write or "flush" any data that is holding in cache to the tape medium. A flush operation generally involves copying data from a cache to a more permanent storage medium such as disk or tape. Once this is done, the transaction can be committed and completed knowing the data is safely on the tape.

However, flushing the data at the end of each transaction reduces performance. The time to position and to perform the actual write operation to the tape storage device usually incurs significant overhead because of the way the tape storage device accesses and manipulates the tape. The flush operation causes the device to stop streaming data to the tape and may often cause a "back-hitch," which is a change in direction on the tape, to perform the flush of the data and to track the resulting physical position on the media. So, as the amount of data that clients need to store continues to grow, the flush operation impacts their ability to perform efficient and quick store operations.

One concept that is being considered to address this problem is increasing the amount of data stored in a transaction. While this does reduce the number of flushes that are required, it has an adverse affect of increased data loss if there are errors during the store operation. This also has the negative effect of the client/server application explicitly telling the device to perform the flush, which still incurs a performance penalty. Also, data transfer to the device becomes synchronous as the application must now wait for the flush to complete before another data storage operation can proceed.

BRIEF SUMMARY OF THE INVENTION

To overcome these and other deficiencies in the prior art, the present invention describes a method and apparatus for reducing the effect of flushes on transaction processing and the amount of time required for clients to store their data, as well as preserving transaction integrity in a transaction-based data storage operation.

In one aspect of the invention, a method for providing transaction-based data storage on a tape storage device includes receiving data associated with respective transactions from a client, providing the data to a cache associated with the tape storage device for storage on a tape medium, calculating associated tape medium positions for the transactions corresponding to an amount of the tape medium needed to store the data thereof, and concluding the transactions when the tape storage device has written past the calculated tape medium positions. The concluding may involve, e.g., storing meta data describing the data on the tape medium in a database and informing the client that the data has been stored.

In another aspect of the invention, a server apparatus for providing transaction-based data storage on a tape storage device includes an interface for receiving data associated with respective transactions from a client, and for providing the data to a cache associated with the tape storage device for storage on a tape medium. The apparatus further includes a control for calculating associated tape medium positions for the transactions corresponding to an amount of the tape medium needed to store the data thereof, and concluding the transactions when the tape storage device has written past the calculated tape medium positions.

A related computer program product is also provided.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

Figure 1:
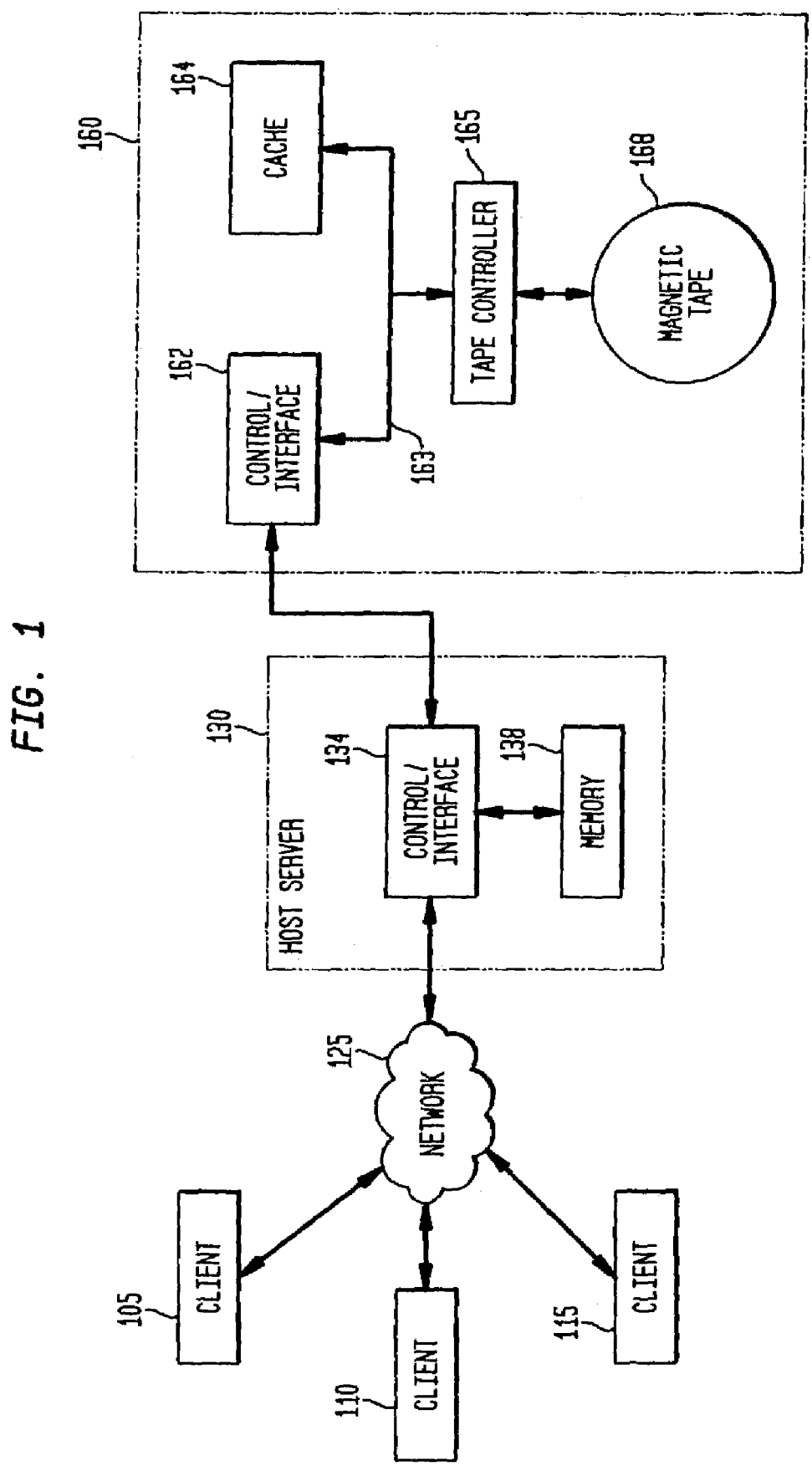
FIG. 1 illustrates a system for storing data on a magnetic storage device according to the invention.

FIG. 1 illustrates a system for storing data on a magnetic storage device. A number of example clients 105, 110 and 115 can communicate with a host server 130 via a network 125 such as the Internet or other wide area network (WAN), or a local area network (LAN) or storage area network (SAN), for instance. The server 130 has an appropriate control/interface 134 for communicating with the clients 105, 110, 115. The server 130 and clients 105, 110, 115 may run software as part of a distributed application. For example, the server 130 may be the IBM Tivoli Storage Manager (TSM). The server 130 provides data storage services to the clients 105, 110, 115 for the purpose of backup, archive, or space management of data. The server 130 is responsible for storing data, such-as files, sent to it by a client. Moreover, within a transaction-based data storage operation, the client sends data to the server 130 within the constructs of a transaction of guaranteed safekeeping. A transaction includes a storage phase, where data is physically placed on a storage medium. This includes insuring that the data is written to the tape or other storage medium and does not remain resident in cache. Once the data has been written, the transaction can be concluded in commit and completion phases. In a commit phase, meta-data describing the data is stored in a database, e.g., at a memory 138 of the server 130. In a completion phase, the server 130 returns a completion status to the client to inform it that the transaction is complete.

The host server 130 communicates the data it receives from the clients to a tape storage device 160 via the control/interface 134. The tape storage device 160 may include a control/interface 162 for communicating with the host server 130, a cache 164, a bus 163, a tape controller 165, and a magnetic tape 168. The IBM 3490 and 3590 are examples of tape storage devices that may be used. Magnetic tape is a sequential access data storage medium that is used for long term storage, such as backing up a server's hard drive, when quick access to the data is not essential. The various types of magnetic tape storage media include cassette tapes, reel to reel tapes, digital audio tape, digital linear tape, helical scan tapes, and linear serpentine tapes, for example. The invention can be adapted for use with any sequential access data storage medium. Note that the tape storage device 160 may be local to, or remote from, the server 130. The tape storage device 160 may communicate with the host server 130 via a SCSI serial connection or via a network such as a SAN, LAN or WAN, for example. The data provided to the tape storage device 160 will generally arrive at an uneven, nondeterministic rate rather than at a constant rate. Since the write operation to the tape medium 168 is more efficient if the client data can be written at a relatively constant rate, the tape storage device 160 will hold some amount of data in its memory 164 before writing it to the tape 168 in a relatively constant rate data stream. This reduces the number of times it may have to access the tape medium 168 during the storing of data. The cache 164, which may be device specific, allows high-end sequential storage devices such as tape drives to stream data more efficiently to the tape media. This data streaming tries to move the most data possible to the media 168 because the time and complexity of positioning and moving the media 168 for the write operation becomes expensive, e.g., time consuming, when there are repeated starts and stops.

Figure 2:
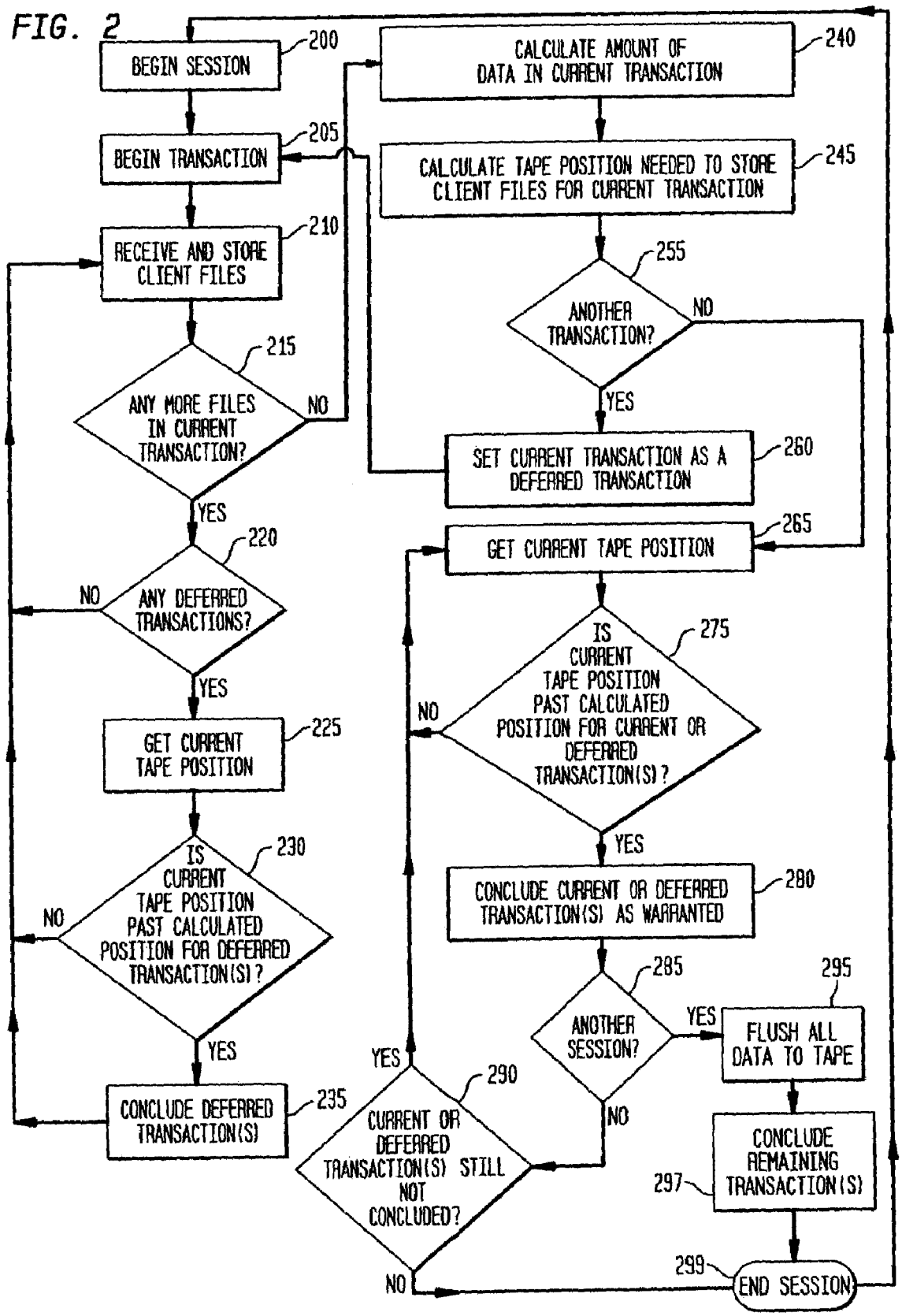
FIG. 2 illustrates a method for storing data according to the invention.

FIG. 2 illustrates a method for storing data. The method may be implemented using appropriate software running on the host server 130 and/or tape storage device 160, for example. The host server 130 is a computer that executes computer code devices such as software that are configured to cause the computer to perform the desired actions as described herein. Note that the invention can be implemented on the tape storage device 160 alone as well. At block 200, a session begins for a client. In a session, the server 130 is servicing a particular client to allow it to store data on the tape medium 168. The data may be stored in one or more transactions, where data such as files is associated with each transaction. Such files may include essentially any type of data. At block 205, a current transaction begins for the client. At block 210, data associated with the transaction is received by the host server 130 and communicated to the tape storage device 160, where the data is stored in the cache 164 and subsequently streamed to the magnetic tape 168 to be written on successive blocks on the tape medium. Each block is typically written in a single operation with the tape continuously running. Moreover, the blocks are typically given sequential identifiers, which may be carried in a header or other meta data of the blocks. Multiple blocks of the same size may be used. A block may contain one or more files, or portions of a file such as records. For example, if the client is running an application related to tracking employees in a company, the files may be associated with different employees, and the records for each file may provide information regarding the employee, such as name, address, job title, salary, and so forth. The tape controller 165 monitors and tracks the current tape and block position and can communicate this information to the host server 130 when queried, as discussed below.

At block 215, if there are additional files in the transaction that have not yet been received, a determination is made as to whether there are any deferred transactions (block 220). A deferred transaction refers to a transaction, such as one or more previous transactions, that has been started but not yet concluded. Assuming there are no deferred transactions, subsequent files for the current transaction are received and stored in the cache (block 210). This cycle is repeated until all files in the transaction have been received.

Figure 3:
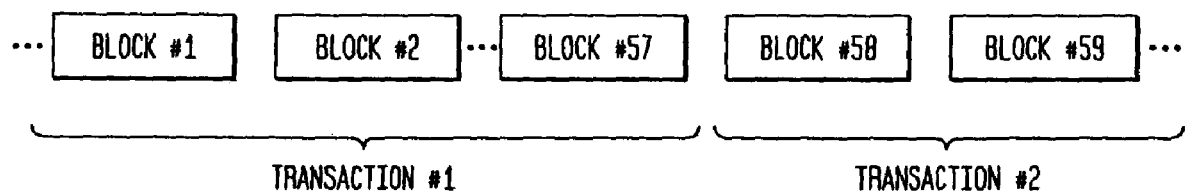
FIG. 3 illustrates the storage of transaction data in different blocks on a magnetic tape according to the invention.

However, if there is a deferred transaction (block 220), the host server obtains the current tape position from the tape storage device (block 225). For example, the control/interface 134 of the host server 130 may communicate with the control/interface 162 of the tape storage device 160 using any suitable communication protocol, for example, a SCSI protocol, to query the tape storage device 160 as to the current tape position, e.g., block position. The host server 130 may also obtain other information from the tape storage device 160, such as block size, through a query prior to a session or at another time. At block 230, a determination is made as to whether the current tape position is past the calculated tape medium position associated with the deferred transaction, that is, whether the tape storage device has written past the calculated tape medium positions. The calculated tape medium position was calculated previously for the deferred transaction at block 245 when the now-deferred transaction was the current transaction. For example, assume the calculated tape medium position of the deferred transaction (transaction #1) indicates the data from the deferred transaction will be fully stored on the tape medium when a block #57 has been written on the tape (see FIG. 3). The amount of tape, and corresponding tape position, needed to store the data for a transaction can be determined based on the amount of data associated with the files and the block size used by the tape medium. In this example, assume there are three files in the current transaction with respective sizes of 256, 512, and 1028 kilobytes, and that the block size, e.g., the amount of data that can be stored in a block is 32 kilobytes. The amount of data in a transaction can be determined using known techniques, such as bit or byte counters. Accordingly, the host server determines that $(256+512+1028)=1796/32=56.125$, rounded up to 57 blocks, are needed to store the files. Then, the host server determines whether the current tape position is past block #57. If the tape medium has not passed the calculated tape position associated with the deferred transaction, the data from the deferred transaction has not yet been fully written to the tape medium, and additional files of the current transaction are received (block 210). For example, if the tape storage device reports back data to the server indicating that the current tape position is block #55, the server concludes that the data from the deferred transaction has not yet been fully written to the tape medium, but is still partly in the cache. If the tape medium has passed the calculated tape position associated with the deferred transaction, e.g., if the current tape position is block #58 or higher, it can be safely concluded that the data from the deferred transaction has been fully written to the tape medium. In this case, the deferred transaction is signaled that its associated data has been stored, and the deferred transaction can be concluded (block 235). Note that storage of files from the current transaction (transaction #2) may begin at block #58 (FIG. 3). Also, note that multiple deferred transactions can be concluded at the same time without the use of a flush.

At block 215 (FIG. 2), if there are no further files remaining in the current transaction, the amount of data in the current transaction is calculated (block 240) for use in calculating the tape position, e.g., a logical tape position, needed to store the client files in the current transaction (block 245). At block 255, if another transaction in the session is waiting to be processed, the current transaction is set as a deferred transaction (block 260) and processing of a new current transaction begins (block 205). If no further transactions are waiting, a determination is made as to whether any deferred transactions or the current transaction can be concluded. Note that there may be more than one deferred transaction pending. In particular, at block 265, the current tape medium position is obtained and, at block 275, a determination is made as to whether it is past any calculated tape medium position for the current or deferred transaction(s), that is, whether the tape storage device has written past the calculated tape medium positions. If so, at block 280, the current or deferred transactions are concluded as warranted. At block 285, if another session has not been requested, or the client has not requested to cancel the current session, a determination is made as to whether any current or deferred transactions(s) have still not been concluded (block 290). If so, the current tape position is obtained again (block 265). This cycle is repeated until all transactions have been concluded. Note that a waiting time may be built in before obtaining the tape medium position at block 265. Advantageously, the conclusion of each transaction is not accompanied by a command to flush the tape storage device's cache. Note also that the transaction may be aborted if an error message or other anomalous condition is detected, e.g., if the transactions have not been concluded within a given amount of time.

At block 285, if another session is desired, typically for a new client, or a tape dismount request has been received, all remaining data in the tape storage device's cache is flushed to the tape medium (block 295), all remaining transactions, e.g., whether deferred or current, are concluded (block 297), and the session ends (block 299). In this case, a flush command is used to ensure that the data in the tape storage device's cache is written to the tape medium before a new session begins.

Accordingly, it can be seen that the invention describes a method and apparatus for improving the performance of transaction-based storage operations by avoiding memory flushes at the end of each transaction in a session. The flush, which is conventionally performed at the end of each transaction, is deferred until the tape is dismounted or a session otherwise ends. The conclusion of a transaction is deferred until the host server determines that the actual physical position of the tape medium is at or past a calculated tape position at which the last data point will be written for the transaction. When the deferred transaction is notified that the write position on the tape medium satisfies the data storage requirements of the given transaction, the transaction is allowed to conclude. The tape is advanced as data from subsequent data storage transactions is stored in a cache and streamed to the tape. Flushes of the memory can be optimally performed by the tape storage device 160 as needed instead of having the client/server application explicitly force this behavior for each transaction.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for providing transaction-based data storage on a tape storage device, the method comprising:
   receiving data associated with a plurality of transactions from at least one client and providing the data to a cache associated with the tape storage device for storage on a tape medium;
   calculating associated tape medium positions for the transactions corresponding to an amount of the tape medium needed to store the data thereof; and
   concluding the transactions when the tape storage device has written past the calculated tape medium positions by informing the at least one client that the with transactions have been fully written to the tape medium.

2. The method of claim 1, wherein:
   the concluding comprises performing commit processing for the transactions.

3. The method of claim 2, wherein:
   the commit processing is performed for the transactions by storing meta data describing the data associated with the transactions in a database.

4. The method of claim 1, wherein:
   the calculated tape medium positions are calculated in accordance with an amount of the data associated with the transactions and a block size used by the tape medium.

5. The method of claim 1, wherein:
   the plurality of transactions are part of a session of the at least one client.

6. The method of claim 1, further comprising:
   querying the tape storage device as to current tape medium positions to determine when the tape storage device has written past the calculated tape medium positions.

7. The method of claim 1, wherein:
   the calculated tape medium positions are calculated as block positions.

8. The method of claim 1, further comprising:
   flushing contents of the cache to the tape medium only when a session of transactions is concluded.

9. A server apparatus for providing transaction-based data storage on a tape storage device, the server apparatus comprising:
   interface means for receiving data associated with a plurality of transactions from at least one client, and for providing the data to a cache associated with the tape storage device for storage on a tape medium; and
   control means for calculating associated tape positions for the transactions corresponding to an amount of the tape medium needed to store the data thereof, and concluding the transactions when the tape storage device has written past the calculated tape medium positions by informing the at least one client that the transactions have been fully written to the tape medium.

10. The server apparatus of claim 9, wherein:
the concluding comprises performing commit processing for the transactions.

11. The server apparatus of claim 10, wherein:
the commit processing is performed for the transactions by storing meta data describing the data associated with the transactions in a database.

12. The server apparatus of claim 9, wherein:
the calculated tape medium positions are calculated in accordance with an amount of the data associated with the transactions and a block size used by the tape medium.

13. The server apparatus of claim 9, wherein:
the plurality of transactions are part of a session of the at least one client.

14. The server apparatus of claim 9, further comprising:
means for querying the tape storage device as to current tape medium positions to determine when the tape storage device has written past the calculated tape medium positions.

15. The server apparatus of claim 9, wherein:
the calculated tape medium positions are calculated as block positions.

16. The server apparatus of claim 9, further comprising:
means for initiating flushing of contents of the cache to the tape medium only when a session of transactions is concluded.

17. A computer program product transactions have been fully written to the tape medium for providing transaction-based data storage on a tape storage device, the computer program product comprising:
computer code devices configured to cause a computer to:
  (a) receive data associated with a plurality of transactions from at least one client and provide the data to a cache associated with the tape storage device for storage on a tape medium;
  (b) calculate associated tape medium positions for the transactions corresponding to an amount of the tape medium needed to store the data thereof; and
  (c) concluding the transactions when the tape storage device has written past the calculated tape medium positions by informing the at least one client that the stored within a computer readable medium.

* * * * *